United States Patent [19]
Brown

[11] Patent Number: 4,878,653
[45] Date of Patent: Nov. 7, 1989

[54] APPARATUS AND METHOD FOR PRE-WIRE ROUTING FOR BUILDINGS

[76] Inventor: James B. Brown, 17992 Milan Pl., Aurora, Colo. 80155

[21] Appl. No.: 168,270

[22] Filed: Mar. 15, 1988

[51] Int. Cl.$^4$ .............................................. B65H 59/00
[52] U.S. Cl. .......................................... 254/134.3 FT
[58] Field of Search ............... 254/134.3 FT, 134.3 R; 52/741; 294/153, 156

[56] References Cited

U.S. PATENT DOCUMENTS

| | | |
|---|---|---|
| 2,321,415 | 8/1940 | Peltz et al. |
| 2,659,335 | 11/1953 | English .................... 254/134.3 R |
| 3,102,715 | 9/1963 | Weitzel et al. ............ 254/134.3 FT |
| 3,166,810 | 1/1965 | Ensley ...................... 254/134.3 FT |
| 3,171,193 | 3/1965 | Bowden ................... 254/134.3 FT |
| 3,698,059 | 10/1972 | Richardson .............. 254/134.3 FT |
| 4,243,164 | 1/1981 | Burlison et al. ..................... 294/153 |
| 4,467,514 | 8/1984 | Dahlke . |

FOREIGN PATENT DOCUMENTS 173557 7/1906 Fed. Rep. of Germany ...... 294/156

Primary Examiner—Robert C. Watson
Attorney, Agent, or Firm—Timothy J. Martin; J. Preston Oxenham

[57] ABSTRACT

A pre-wire routing apparatus and method is provided during construction of a building to provide an inexpensive way to later install a wiring interconnect between first and second terminal locations. The apparatus includes a strand of flexible material, preferably string, which has an enlarged tail element at a trailing end and an enlarged head element connectable at a leading end. Fastening structure, such as a cable tie, is secured to the leading end to allow selected connection of the head element to the strand after the strand has been threaded along an interconnect pathway through an interior wall portion of the building. The fastening structure preferably forms a leader to facilitate installation, the tail element is a pull ring and the head element is a waisted rod. Protector sleeves may be positioned in openings, e.g., bores, formed in the internal framing elements, and, in an alternative embodiment, a sheath surrounds the strand. The method has the steps of forming openings through the internal framing elements to define an interconnect pathway between a pair of terminal locations through adjacent openings and the interior spaces between the framing elements, installing a flexible strand along the pathway and securing opposite ends of the strand at a respective terminal location.

19 Claims, 2 Drawing Sheets

APPARATUS AND METHOD FOR PRE-WIRE ROUTING FOR BUILDINGS

BACKGROUND OF THE INVENTION

The present invention is directed to an apparatus that is useful for establishing pre-wire routing pathways in a building during its construction phase such that electrical wires may be installed after completion of construction of the building in an easy and convenient manner. This apparatus and method provides a means for placing electrical wiring in the wall portions of a building after it has been constructed without compromising the exterior surface finish of the wall portions. It should be understood that the present invention may be used also for pre-routing of non-electrical cables, such as fiber optics and the like.

During construction phase of a building, it is extremely easy to install electrical wiring between outlet boxes, junction boxes, switches and fixtures for various purposes, such as electrical power, telephone communications, computer networking, audio communications, and the like. This is understandable since, during construction, the various wall portions of the building are normally framed with internal structural elements and subsequently covered by exterior surface elements. Designated utility terminal locations can easily be mounted to these internal framing elements prior to the completion of the wall portion and suitable wiring interconnects may be installed by running cable through openings or bores formed in the internal framing elements. However, once the exterior surface covering portions have been placed over the internal framing elements, it is very difficult to run electrical interconnects to other locations. Whereas it is sometimes possible to drop a wire between vertically oriented internal framing elements, the installation of lateral interconnects are difficult since the wall surface must be removed so that bores can be drilled in adjacent framing elements. Naturally, this is quite destructive and results in substantial expense in refinishing the wall surface.

As a result of the difficulties and expense of placing electrical wiring in a wall after completion of that wall, there has been a modern tendency to design and install extra outlets and junction boxes for both residences and commercial buildings. While this leads to increased convenience to the occupant of such structure, there is a disadvantage in the increased costs in materials for such terminal locations, especially in the cost of electrical conduit which has experienced a rapid rise in costs over the last few years. Another drawback in this procedure is the requirement of cover plates for outlet boxes which can mar the aesthetic appearance of the exterior finish of a wall. Finally, even with the installation of numerous terminal locations throughout a structure, the need often arises for subsequent installation of an outlet or junction box at a location not previously anticipated in place. Accordingly, there is a need for a method and apparatus that allows greater flexibility in installation of electrical terminal locations after a building has been constructed and occupied.

SUMMARY OF THE INVENTION

It is an object of the present invention to provide a new and useful apparatus and method to allow the pre-wire routing of electrical pathways in a building during construction so that additional outlet boxes, junction boxes, switches, fixtures, and the like may be installed without compromising the integrity of the exterior surfaces of the walls which contain such terminal locations.

Another object of the present invention is to provide an inexpensive method and apparatus therefor which allows numerous electrical terminal locations to be designated and pre-wire routed during the framing of a wall portion so that, after completion of the wall, electrical cable can be installed both vertically and laterally through the walls without removing exterior surface covering elements.

It is another object of the present invention to provide an apparatus in the form of an inexpensive strand-like element which may be easily secured at one terminal location and strung along a pathway between the framing elements of a wall and bores formed therein to a second terminal location and which may be readily secured thereto.

It is still another object of the present invention to provide a method for pre-wire routing of a building to allow the designation of numerous potential terminal locations which may be pre-wire routed without greatly increasing the expense of construction of the building.

Apparatus according to the present invention is thus adapted for pre-wire routing a building during construction whereby an electrical wire or the like may be drawn as an electrical interconnect along a pathway between first and second terminal locations in a wall portion of the building. In its broad form, this apparatus includes a strand of flexible material, preferably string, which has a selected diameter, a leading end and a trailing end. An enlarged tail element is connected to the strand at the trailing end, and a large head element may be selectably connected to the leading end of the strand. To this end, a fastening structure, preferably a cable tie, is attached to the strand at the leading end thereof so that the enlarged head element may be conveniently secured once the strand is placed along a pathway to be pre-wire routed.

In the preferred form, the tail element and the head element each has a projectional dimension greater than the diameter of the strand in all respective geometrical planes of projection. The tail element may be a pull ring to facilitate removal of the strand from the pathway as the strand draws an electrical cable therealong. The head element may be a rod-like member having a narrow, waisted central portion, and the fastening structure includes a belt element adapted to encircle the waisted central portion so that it may be cinched in a fastened condition thereby connecting the head element to the strand. Since the pre-wire routing apparatus is adapted to be threaded from a first terminal location through the open interior regions and through openings formed in the internal framing elements, the leading end of the strand is provided with a leader in the form of a stiff yet resilient material operative to facilitate the threading of the strand through the opening. This leader may conveniently be the belt of the cable tie. A protector sleeve may be inserted within each opening formed in the internal framing element to prevent the strand, and a wiring cable attached thereto, from becoming stuck during the actual wiring of the building at a future time. An outer sheath may also be provided for the strand so that the sheath extends from one terminal location to the other thereby greatly facilitating the withdrawal of the strand and the insertion of a wire through the outer sheath.

With this apparatus in mind, the method according to the present invention includes the steps of forming an opening through each internal framing element that blocks a desired route between first and second terminal locations designated prior to the completion of a wall portion by the mounting of exterior surface forming elements on the framing portions. Each opening is formed to have a diameter at least as large as the diameter of an electrical wire to be later inserted whereby a continuous open pathway is created between the first and second terminal locations. This pathway is defined by each opening and the interior spaces within the interior of the associated wall portions between the internal framing elements intermediate of the first and second terminal locations. The method then includes the steps of securing a first end of a strand of flexible material at the first terminal location, running the strand completely along said pathway through consecutive ones of said openings and interior spaces, and securing a second end of the strand opposite the first end at said second terminal location.

In the preferred method, the openings and the internal framing elements preferably are bores formed through each internal framing element that blocks the desired route; a protector sleeve may be provided and inserted in each bore to facilitate the passage of the later inserted wire through each said bore. Preferably, a plurality of terminal locations are designated, and the method for determining the interconnect routes thereamong and running a plurality of strand segments between pairs of terminal locations according to the interconnect route is accomplished. Some of these terminal locations may be outlet boxes or junction boxes actually installed during the construction of the wall portion with the remaining of the terminal locations being future designated or potential terminal locations for later use. To complete the operation of wiring the structure, an electrical wire is secured to the end of a selected strand at one of the terminal locations and this strand is withdrawn from the other terminal location whereby the wire is pulled along said pathway between the terminal locations. In the preferred method, after the pre-wire routing of the building, the method may include the step of completing construction of the wall portion by mounting exterior surface forming elements to the internal framing elements.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention relates to an apparatus and a method to allow construction personnel to pre-wire route a building such as a residence or office building in a manner to permit insertion of interconnect cables after completion of the building without destroying the exterior surface finishes of the walls thereof. To this end, the apparatus according to the present invention is adapted to be mounted between a pair of designated terminal locations during the construction phase of the building by mounting the apparatus after the internal framing elements of the wall portions have been erected but prior to completion of the wall portion by the mounting of exterior wall surface forming elements on the internal framing elements. The method contemplates the identification of terminal locations, both to be presently installed and which may be desired in the future, and the establishment of pathways through the framing elements of the building and the insertion of a non-metallic flexible strand along the pathway so as to allow a wire to be subsequently drawn along the pathway. For purposes of this application, the term "terminal location" shall mean outlet boxes, junction boxes, switches, fixture boxes, and the like, which define end points for electrical wiring. In addition, although the present invention is described with respect to electrical wiring, the apparatus and method is usable with other types of cable, such as fiber optics, wherein pre-routing would be desirable. Thus, the term "wire" or "cable" encompasses all such wiring and communications lines.

Figure 1:
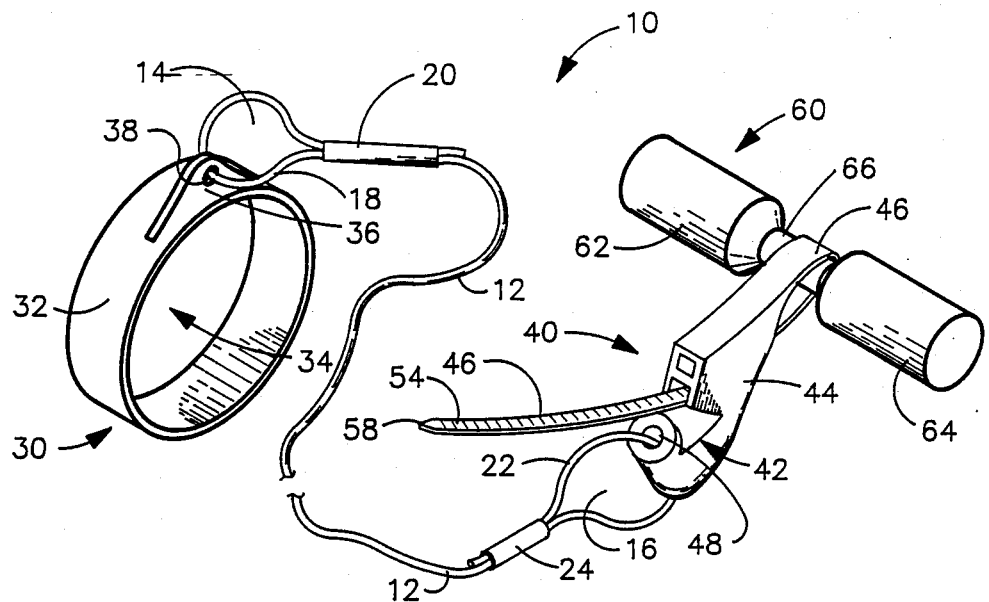
FIG. 1 is a perspective view of a pre-wire routing apparatus according to the preferred embodiment of the present invention.

According to the preferred embodiment of the present invention, the preferred form of the pre-wire routing apparatus is shown in FIG. 1. Here, pre-wire routing apparatus 10 is formed by an elongated strand 12 of flexible material of a selected length which is preferably in the form of a string, synthetic monofilament and the like having a length of approximately 15–20 feet. Strand 12 has a trailing end 14 to which is secured a tail element 30 and a leading end 16 to which is secured a head element 60 by means of a fastening means in the form of a cable tie 40. In order to accomplish this, trailing end 14 is formed by a loop portion 18 that is secured by crimping element 20. Loop portion 18 extends through a hole 38 formed in tongue 36 of tail element 30. Similarly, leading end 16 of strand 12 is formed as a loop portion 22 which is formed by an end of strand 12 folded back upon itself and retained by crimping element 24. Loop portion 22 extends through a hole 48 formed in cable tie 40, as described below.

As is best shown in FIG. 1, tail element 30 is formed as an annular pull ring 32 which has a central opening 34 sized to be seized by the fingers of a human hand. Tongue 36 projects radially outwardly from the outer wall of pull ring 32 and includes hole 38 which receives loop portion 18, as noted above. Tail element 30 may be formed out of any suitable material, such as plastic, metal and the like. It may be noted from FIG. 1, that tail element 30 is sized so that it has a projectional dimension greater than the diameter of strand 12 for any geometric plane of projection.

Figure 2:
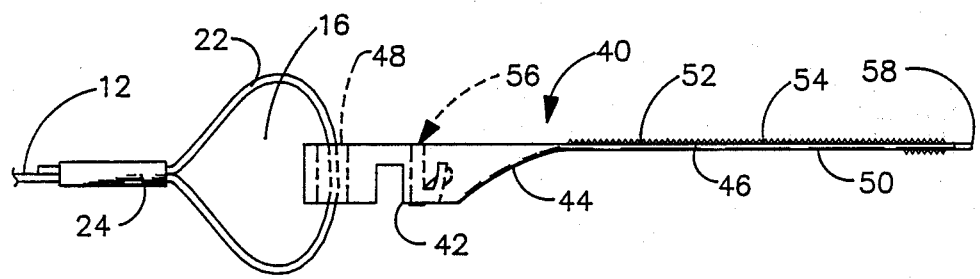
FIG. 2 is a side view in elevation showing the leading end of the apparatus of FIG. 1 prior to attachment of the head element thereto.

Cable tie 40 is best shown in FIGS. 1 and 2 and includes a mounting head 42, a central latching structure 44, and a belt element 46 projecting oppositely of latching structure 44 opposite mounting head 42. Hole 48 is formed in head 42 and receives loop portion 22, as noted above. Cable tie 40 is formed of a stiff yet resilient material such as plastic, known in the art. Furthermore, belt 46 has a first surface 50 and a second surface 52 with second surface 52 being provided with a plurality of ribbed teeth 54. Latching structure 44 includes a passageway or slot 56 formed therethrough which receives a free end 58 of belt element 46 so that belt element 46 becomes retained in latching structure 44 by the engagement of rib teeth 54 with latching structure 44. As is shown in FIG. 2, belt element 46 may form a leader for strand 12 with cable tie 40 forming a fastening means at leading end 16 of strand 12.

As is shown in FIG. 1, cable tie 40 is adapted to connect enlarged head element 60 to the free end 16 of strand 12. To this end, head element 60 is preferably in the form of a rod-like member having cylindrical end portions 62 and 64 connected together by a waisted central portion 66. Head element 60 is formed of any suitable material such as plastic, metal or wood and is sized so that it has a projectional dimension greater than the diameter of strands 12 for all geometric planes of projection. As is shown in this figure, cable tie 40 may be used to connect head element 60 to strand 12 by encircling waisted central portion 66 by belt element 46 after which belt element 46 is cinched around waisted central portion 66 and fastened in latching structure 44.

Figure 3:
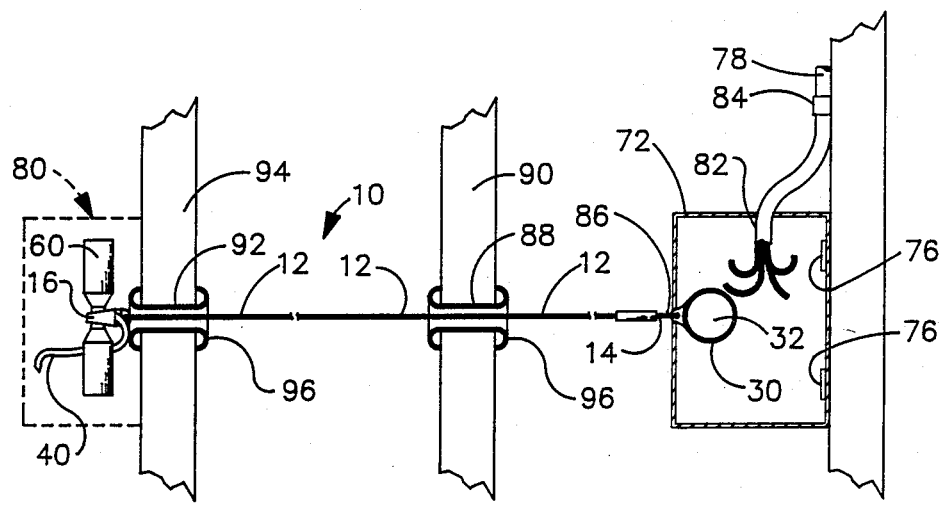
FIG. 3 is a side view in partial cross section and broken away, showing the apparatus of FIG. 1 in an installed position between first and second terminal locations.

The use of a single pre-wire routing apparatus 10 is shown in FIG. 3. Here, apparatus 10 extends between a first terminal location 70 and a second terminal location 80, shown in phantom. As is shown in FIG. 3, for example, a telephone outlet box 72 which is mounted to an internal framing element 74, in the form of a two-by-four stud, by means of mounts 76. A telephone cable 78 is also mounted, by mount 84, to framing element 74. Telephone cable 78 has an exposed end 82 that terminates inside of outlet box 72, as is known in the art.

A second terminal location is designated in phantom at 80 and may be any type of telephone terminal location, as noted above. A hole 86 is formed in outlet box 72 and apparatus 10 ia mounted by passing strand 12 through hole 86 so that tail element 30, in the form of pull ring 32, abuts the interior side wall of outlet box 72 and prevents the exit of trailing end 14 therefrom. Strand 12 extends through an opening or bore 88 formed in intermediate internal framing element 90 and continues to extend through a bore 92 in internal framing element 94. Each of bores 88, 92 are provided by a respective protector sleeve 96 which helps prevent the binding of strand 12 as it passes through a respective bore 88 and 92. After strand 12 is threaded through bores 88 and 92, head element 60 is connected to leading end 16 of strand 12 by cable tie 40, as described above. Bores 88 and 92, as well as the opening of each protector sleeve 96, is sized so as to permit easy passage of strand 12 therethrough and also to allow later threading of a desired electrical cable, such as a telephone cable similar to cable 78, through the pathway formed thereby. Accordingly, it should be appreciated that pre-wire apparatus 10 forms a pathway between terminal location 72 and terminal location 84 so that a telephone cable may be secured to either of the trailing or leading ends of strand 12 at the respective one of the terminal locations after which strand 12 is withdrawn from the pathway by removing it from the other terminal location so as to pull the telephone cable therethrough. It is preferred that the cable be attached at the leading end 16 of strand 12 so that pull ring 32 may be conveniently withdrawn by the user. It should be understood that head element 60 and cable tie 40 are removed prior to the attachment of a telephone cable to strand 12. Furthermore, strand 12 should not be taut, but rather should have sufficient length to provide loose end portions to which a wire may later be attached for installation.

Figure 4:
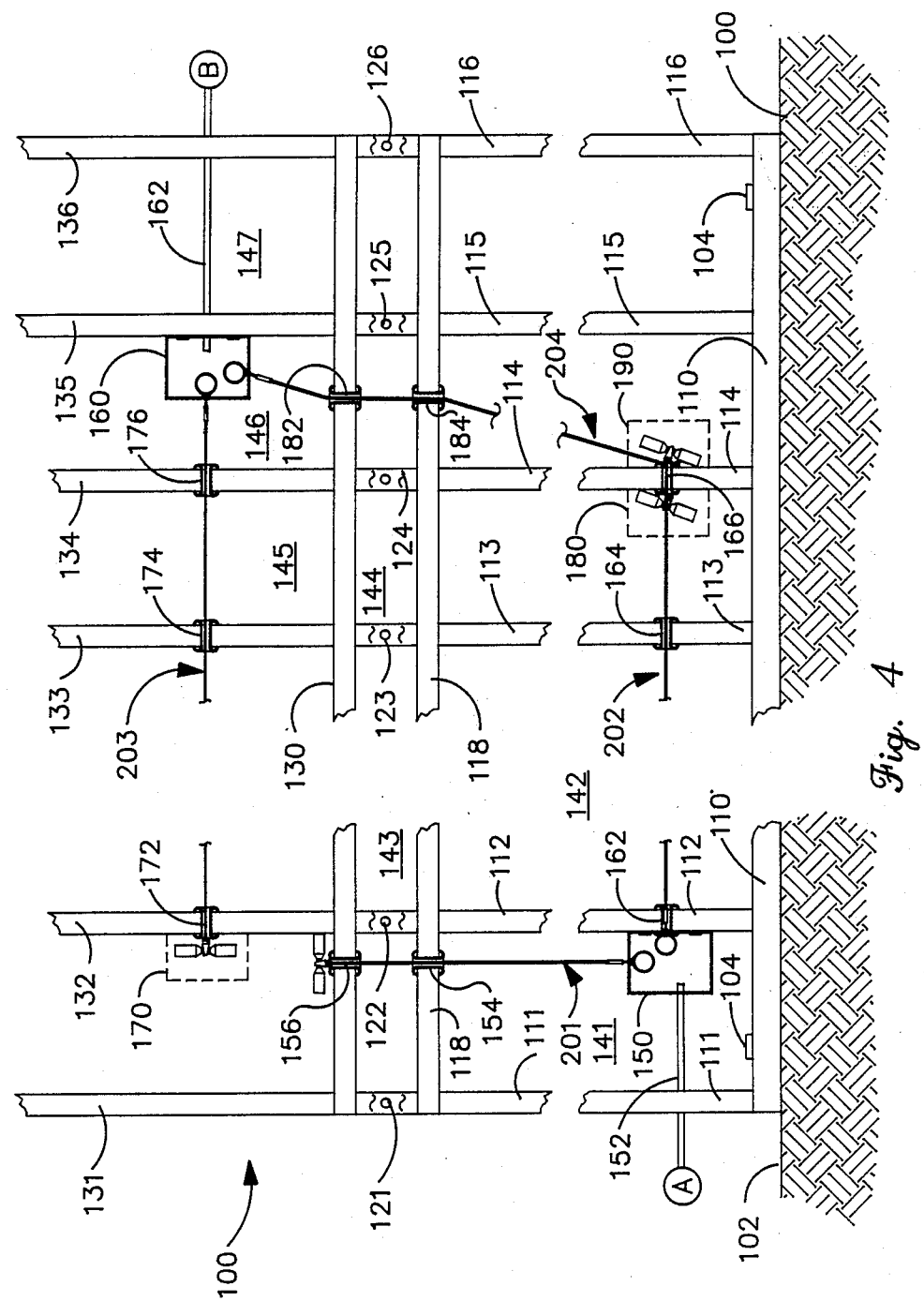
FIG. 4 is a cross sectional view of a building portion having internal framing elements and showing a plurality of interconnect pathways between a plurality of terminal locations utilizing the apparatus and method of the present invention.

A more complex implementation of the apparatus and method according to the present invention is shown in Fig. 4, and this implementation will be used to explain more thoroughly the method according to the preferred embodiment. In FIG. 4, a frame structure 100 for a building is shown supported by surface 102. Framing structure 100 includes a sill plate 110, secured to surface 102 by anchor bolts 104, and a plurality of vertical studs or internal framing elements 111–116 extending perpendicularly upwardly therefrom. Lateral or horizontal top plate 118 is supported by vertical elements 111–116, and a plurality of transverse joists 121–126 extend horizontally and orthogonally to member 118 and the respective internal framing elements 111–116. A sole plate 130 then extends across elements 121–126 and is supported thereby. A plurality of second studs or internal framing elements 131–136 extend perpendicularly upwardly from sole plate 130 and may be aligned with respective elements 111–116 as well as elements 121–126. Electrical utilities of a common nature are provided at location A and at location B. Internal framing elements may thus be understood to refer to any support structure elements located internally of walls, floors and ceilings of the building. Open interior regions, for example spaces 141–147, thus exist between the internal framing elements.

According to the present method, a plurality of terminal locations are designated for actual and potential use for the particular building. These may be selected for existing locations according to architectural plans for the building and future locations may be planned for expanded use of the facilities. By way of example, and not limitation, an existing location 150 is selected for interconnect A and an existing terminal location 160 is designated for electrical interconnect B. Terminal 150 is connected to interconnect A by means of cable 152, and terminal location 160 is connected to electrical interconnect B by cable 162. A plurality of potential terminal locations are selected such as locations 170, 180 and 190, all shown in phantom.

A first pathway is established between terminal location 150 and terminal location 170 and is provided with a first pre-wire routing apparatus 201 which extends from outlet box 150 through a pair of holes 154 and 156 formed in top plate 118 and sole plate 130, respectively. Attachment is made similar to that shown in FIG. 3. A second pre-wire routing apparatus 202 extends between terminal location 150 and each of terminal locations 180 and 190. Apparatus 202 extends through bores 162, 164 and 166 formed respectively in vertical elements 112, 113 and 114. A third pre-wire routing apparatus 203 extends from terminal location 160 to terminal location 170, and extends through bores 172, 174 and 176 formed respectively in vertical elements 132, 133, and 134, respectively. Finally, a fourth pre-wire routing apparatus 204 extends from terminal location 160 to each of terminal locations 180 and 190 by extending through bores 182 and 184 formed respectively in floor member 130 and ceiling member 118 as well as through bore 166 formed in vertical element 114. Interconnect pathways are thus established whereby any of terminal locations 150, 160, 170, 180 and 190 may be provided with service from utility A and/or B after completion of construction. Each of routing apparatus 201–204 should have sufficient length to allow subsequent attachment of a desired wire.

The method according to the preferred embodiment of the present invention is thus adapted for use during the construction of the building which is to have wall portions formed by internal framing elements and exterior wall surface forming elements to define an interior therein. The method contemplates the pre-wire routing of the building prior to completion of the wall portions in order to provide means for later inserting an electrical wire of selected diameter between first and second designated terminal locations after the completion of construction of the wall portions without compromising the exterior surface forming elements. Where terminal locations are not actually installed during the construction phase, the designated locations must be appropriately mapped for future identification. To this end, the first and second terminal locations are located at respective first and second internal framing elements such that a desired route through the interior of the wall portions between the first and second terminal locations is otherwise blocked by at least one internal framing element. For purposes of this description the phrase "without compromising the exterior surface forming elements" contemplates the use of the method without the need to remove or destroy any substantial portion of the exterior surface of the wall portion although the formation of openings at the first and second terminal locations is necessary for the installation of an outlet box, junction box, switch or fixture therein.

Accordingly, then, the steps of the preferred method include first forming an opening through each internal framing element that blocks the desired route such that each opening has a diameter at least as large as the diameter of the electrical wire to be later inserted. This step then creates a continuous open pathway between the first and second terminal location wherein each such pathway is defined by each opening and the interior spaces within the interior of the associated wall portion between the internal framing elements intermediate of the first and second terminal locations. Next, the method includes securing a first end of a strand of flexible material at the first terminal location and the running of the strand completely along the pathway through consecutive openings and interior spaces after which a second end of a strand opposite the first end is secured at the second terminal location. It is completely within the scope of the present invention, however, that the strand could be run completely along the pathway prior to actually securing at either end. If desired, the openings formed in the internal framing elements may preferably be formed as bores, and the method may include the step of inserting a protector sleeve in selected ones of said bores to facilitate the passage of the wire as it is later inserted through such bores.

Preferably, in any building construction, a plurality of terminal locations are designated, and the method includes the step of determining the various interconnect routes thereamong and running a plurality of strand segments between pairs of terminal locations according to said interconnect routes. Here, it is convenient that some of the terminal locations, such as the first terminal location, are outlet boxes which are actually installed during the construction of the wall portion and which will be immediately available for use by the occupant. However, some of the terminal locations, such as the second terminal location, is a designated potential location for an outlet box, a junction box, a switch box, a fixture box, and the like. Naturally, the method is completed by the step of securing an electrical wire to the end of a flexible stand at one of the terminal locations after construction of the building and pulling the wire therealong said pathway by withdrawing the strand from the other terminal location thereby advancing the wire through the wall portion.

From the foregoing, it should be also understood that the method of the present invention contemplates the formation of walls in a building during construction so that pre-wire routing is provided for potential terminal locations for a selected type of utility service. Thus, this method includes the steps of: erecting internal structural elements for said walls; determining the location of the initial terminal locations to be installed during construction for the selected type of utility service; installing an interconnecting outlet box and junction boxes, respectively, at the initial terminal locations as necessary to meet the needs of the building; selecting additional terminal locations to be available for outlet boxes and junction boxes, respectively, to meet potential future needs for the selected type of utility service for the building; determining the wire interconnect pathways between the initial terminal locations and the additional terminal locations and the size of the electrical wire to be later inserted to actually establish electrical interconnects therebetween; forming openings through each internal structural element that blocks the wiring interconnect path between the initial terminal locations and the additional terminal locations of a size sufficient to allow passage therethrough of the wire to be later installed; threading a strand of flexible material along each wiring interconnect pathway between each additional terminal location and its associated one of said initial terminal locations and additional terminal locations with said strands passing through respective ones of said openings; securing opposite ends of said strands at their respective terminal locations; mapping the location of the additional terminal location; and completing construction of the walls by covering said internal framing elements with exterior wall surface forming elements whereby, subsequent to the completed construction, a wire may be run through a wall portion of the building without compromising the exterior wall surface forming elements by making outlet openings at a pair of associated terminal locations, by retrieving the opposite ends of the respective said strand, by securing an end of the wire to one end of the said strand, and by withdrawing the strand from the wall portion at the other end so as to advance the wire through the wall portion.

Figure 5:
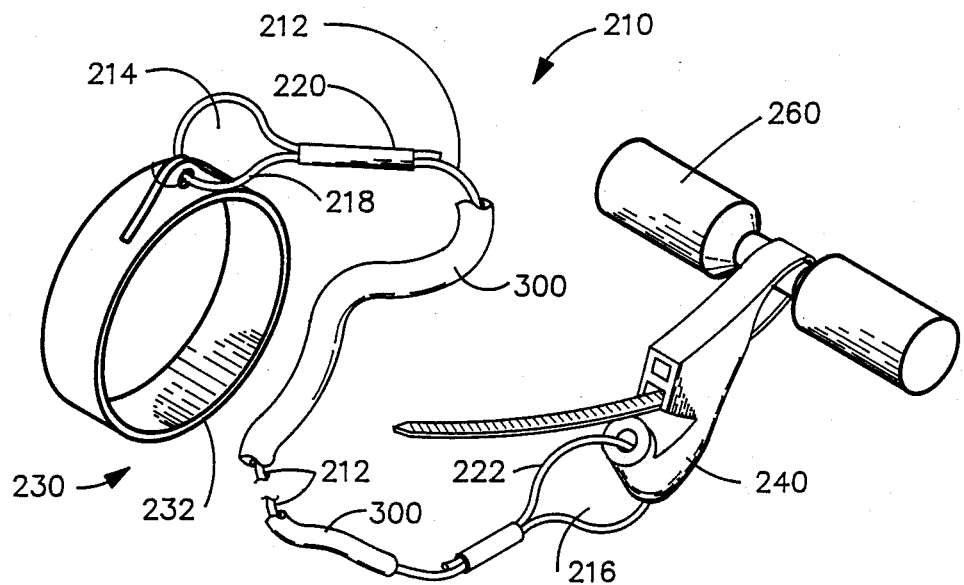
FIG. 5 is an alternate embodiment of the pre-wire routing apparatus according to the present invention.

An alternate embodiment of the pre-wire routing apparatus according to the present invention is shown in FIG. 5. Here, pre-wire routing apparatus 210 is formed substantially identically with the apparatus shown in FIG. 1, and includes a strand 212 of flexible material having a trailing end 214 and a leading end 216. A loop 218 is located at the trailing end and secures a tail element 230 in the form of a pull ring 232. A loop portion 222 located at the leading end secures a fastening means in the form of a cable tie 240 which, in turn, mounts a head element 260 in the form of a waisted rod. Pre-wire routing apparatus 210 differs from that shown in FIG. 1 in the inclusion of an auxiliary sheath 300 which encases substantially the entire length of strand 212. Sheath 300 fits loosely around strand 212 and provides a protective covering for strand 212. When apparatus 210 is mounted in the building, a wire may be drawn along the pathway by attaching the wire to one of the ends of strands 212 and advancing the wire through protective sheath 300. Thus, sheath 300 helps prevent binding of the wire during installation and allows the easy withdrawal of strand 212. To this end, sheath 300 should have an internal diameter sufficient to allow insertion of a wire of selected size to permit installation of the desired utility service.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. Apparatus adapted for pre-wire routing a building during construction whereby an electrical wire, cable or the like may be drawn along a pathway between first and second terminal locations in a wall portion of the building, comprising:
   a strand of flexible material having a selected diameter, a leading end and a trailing end;
   an enlarged tail element connected to said strand at the trailing end thereof;
   an enlarged head element; and
   fastening means having a leader formed of stiff, resilient material attached to said strand at the leading end thereof for selectably connecting said enlarged head element to the leading end of said strand.

2. Apparatus according to claim 1 wherein said tail and head elements each has a projectional dimension greater than the diameter of the strand for all respective geometric planes of projection.

3. Apparatus according to claim 1 wherein said tail element is a pull ring.

4. Apparatus according to claim 1 wherein said fastening means includes a cable tie.

5. Apparatus according to claim 1 wherein said strand is a string.

6. Apparatus according to claim 1 wherein said wall portion is formed by internal framing elements separated by open interior spaces, said apparatus adapted to be ran from said first terminal location to said second terminal location through said open interior spaces and threaded through openings formed in said internal framing elements, said leading end of said strand provided with a leader formed of stiff yet resilient material operative to facilitate the threading of said strand through said openings.

7. Apparatus according to claim 1 wherein said fastening means is a cable tie having a belt element and a latching structure, said leader defined by said belt element.

8. Apparatus according to claim 6 including a protector sleeve sized to be positioned in an opening in a respective internal framing element to allow smooth movement of said strand therethrough.

9. Apparatus according to claim 1 including an outer sheath surrounding said strand and extending between the first and second terminal location and having a diameter sufficient to allow said strand to be attached to said electrical wire and easily drawn out of said sheath thereby drawing said wire into the sheath along said pathway.

10. In a building having partial wall portions including an interior and formed by internal framing elements, a method of pre-wire routing said building prior to completion of said wall portions by mounting the exterior wall surface forming elements to provide means for later inserting an electrical wire of selected diameter between first and second designated terminal locations after completion of construction of the wall portions without compromising the exterior surface forming elements wherein the first and second terminal locations are located at respective first and second internal framing elements and wherein a desired route through the interior of the wall portions between said first and second terminal locations is blocked by at least one internal framing element, comprising the steps of:
   forming an opening through each internal framing element that blocks the desired route with each said opening having a diameter at least as large as the diameter of the electrical wire to be later inserted whereby a continuous open pathway is created between said first and second terminal locations and is defined by each said opening and interior spaces within the interior of associated said wall portions between the said internal framing elements intermediate of said first and second terminal locations;
   securing a first end of a strand of flexible material at said first terminal location;
   running said strand completely along said pathway through consecutive ones of said openings and interior spaces; and
   securing a second end of said strand opposite the first end at said second terminal location.

11. A method of pre-wire routing according to claim 10 wherein said openings are bores formed through each said internal framing element that blocks the desired route.

12. A method of pre-wire routing according to claim 11 including the step of inserting a protector sleeve in selected ones of said bore to facilitate passage of said wire through said bore.

13. A method of pre-wire routing according to claim 10 wherein a plurality of terminal locations are designated and including the step of determining interconnect routes thereamong and running a plurality of strand segments between pairs of terminal locations according to said interconnect routes.

14. A method of pre-wire routing according to claim 10 where the first terminal location is an outlet box installed during the construction of said wall portion and the second terminal location is a potential location for an outlet box, junction box, switch box, fixture box, and the like.

15. A method of pre-wire routing according to claim 10 including the step of securing said wire to the end of said strand at one of the terminal locations after construction of the building and pulling said wire along said pathway by withdrawing said strand from the other terminal location thereby advancing the wire through the wall portion.

16. Apparatus adapted for pre-wire routing a building during construction whereby an electrical wire, cable or the like may be drawn along the pathway between first and second terminal locations in a wall portion of the building, comprising:

a strand of flexible material having a selected diameter, a leading end and a trailing end;

an enlarged tail element connected to said strand at the leading end thereof;

an enlarged head element including a rod like member having a wasted central portion; and fastening means including a belt element adapted to encircle said head element around the waisted central portion to be pinched and fastened therearound to connect said element to the leading end of said strand.

17. Apparatus according to claim 16 wherein said fastening means includes a cable tie.

18. Apparatus adapted for pre-wire routing in a building during construction whereby an electrical wire, cable or the like may be drawn along a pathway between first and second terminal locations in a wall portion of the building, comprising:

a strand of flexible material having a selected diameter, a leading end and a trailing end;

an enlarged tail element connected to said strand at the trailing end thereof;

an enlarged head element; and fastening means having a leader formed of stiff but resilient material attached to said strand at the leading end thereof for selectively connecting said enlarged head element to the leading end of said strand;

a protector sleeve sized to be positioned in openings along said pathway between first and second terminal locations in said wall portion to allow smooth movement of said strand along the pathway.

19. Apparatus adapted for pre-wire routing a building during construction whereby an electrical wire, cable or the like may be drawn along a pathway between first and second locations in a wall portion of the building, comprising:

a strand of flexible material having a select diameter, a leading end and a trailing end;

an enlarged tail element connected to said strand at the trailing end thereof;

an enlarged head element and fastening means attached to said strand at the leading end thereof for selectively connecting said enlarged head element to the leading end of said strand;

and an outer sheath containing said strand therein, whereby said strand can be attached to said wire allowing said strand to be easily drawn through the sheath while pulling said wire into the sheath along the pathway.

* * * * *